US007937620B2

(12) United States Patent
Wang et al.

(10) Patent No.: US 7,937,620 B2
(45) Date of Patent: May 3, 2011

(54) TRANSIENT FAULT DETECTION BY INTEGRATING AN SRMT CODE AND A NON SRMT CODE IN A SINGLE APPLICATION

(75) Inventors: Cheng Wang, Santa Clara, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 847 days.

(21) Appl. No.: 11/745,403

(22) Filed: May 7, 2007

(65) Prior Publication Data

US 2008/0282257 A1 Nov. 13, 2008

(51) Int. Cl.
*G06F 11/00* (2006.01)
*G06F 11/14* (2006.01)

(52) U.S. Cl. ............ 714/21; 717/140; 717/162; 714/35; 714/38

(58) Field of Classification Search .................... 714/38, 714/39, 49, 50, 15, 21, 32, 35; 718/106; 717/145, 149, 140; 712/220, 233
See application file for complete search history.

(56) References Cited

U.S. PATENT DOCUMENTS 5,623,471 A * 4/1997 Prigge .............................. 369/84
6,405,326 B1 * 6/2002 Azagury et al. ................ 714/38
6,978,444 B1 * 12/2005 Farchi et al. .................. 717/129
7,069,549 B2 * 6/2006 Charnell et al. .............. 717/158
7,231,554 B2 * 6/2007 Moser et al. .................... 714/38
7,603,664 B2 * 10/2009 Dutt et al. ..................... 717/153
2005/0050386 A1 * 3/2005 Reinhardt et al. .............. 714/13
2005/0114856 A1 * 5/2005 Eickemeyer et al. ......... 718/100
2007/0162894 A1 * 7/2007 Noller et al. .................. 717/124
2007/0174837 A1 * 7/2007 Wang et al. ................... 718/100
2008/0244354 A1 * 10/2008 Wu et al. ....................... 714/755
2008/0282116 A1 11/2008 Wang et al.

OTHER PUBLICATIONS

Googe definitions of Function retrieved Jul. 18, 2010 by searching in Google for "define:function".*
Non-Final Office Action received for U.S. Appl. No. 11/770,095, mailed on Dec. 30, 2009, pp. 13.
Non-Final Office Action received for U.S. Appl. No. 11/770,095, mailed on Jul. 22, 2010, pp. 8.

* cited by examiner

*Primary Examiner* — Scott T Baderman
*Assistant Examiner* — Joseph Schell
(74) *Attorney, Agent, or Firm* — Grossman, Tucker, Perreault & Pfleger, PLLC

(57) ABSTRACT

Disclosed is a method for running a first code generated by a Software-based Redundant Multi-Threading (SRMT) compiler along with a second code generated by a normal compiler at runtime, the first code including a first function and a second function, the second code including a third function. The method comprises running the first function in a leading thread and a tailing thread (104); running the third function in a single thread (106), the leading thread calls the third function and running the second function in the leading thread and the tailing thread (108), the third function calls the second function. The present disclosure provides a mechanism for handling function calls wherein SRMT functions and binary functions can call each other irrespective of whether the callee function is a SRMT function or a binary function and thereby dynamically adjusts reliability and performance tradeoff based on run-time information and user selectable policies.

17 Claims, 4 Drawing Sheets

302

```
leading_main() {
   ...
   // call binary function bar2
   ret = bar2();
   // notify call end
   send END_CALL;

   // pass return value
   send ret;
   ...
}
// LEADING version of bar
leading_bar() { ... }
```

(a)

304

```
tailing_main() {
   ...
   // wait_for_notification loop
   do {
      // get notification
      Receive func;
      // check call end
      if(func == END_CALL)
         break;
      // get parameters
      Receive parameters;
      // call tailing_bar
      // through function pointer
      call *func with parameters;
   } while(1);
   // get function return value
   Receive ret;
   ...
}
// TAILING version of bar
tailing_bar() { ... }
```

(b)

306

```
// EXTERN version of bar
EXTERN bar() {
   // notify tailing thread
   // with function pointer
   // and parameters
   send tailing_bar;
   send parameters;
   leading_bar();
}

// binary function bar2
bar2() {
   ...
   ret = bar();
   ...
}
```

```
// LEADING version of setjmp
leading_setjmp(env) {

  send env;
  _setjmp(env);
}

// LEADING version of
longjmp
leading_longjmp(env) {

  send env;
  _longjmp(env);
}
```

(a)

404

```
// TAILING version of setjmp
tailing_setjmp(dummy) {
  Receive env;
  hash_alloc(env, new_env);
  _setjmp(new_env);
}

// TAILING version of
longjmp
tailing_longjmp(dummy) {
  Receive env;
  new_env =
hash_lookup(env);
  _longjmp(new_env);
}
```

(b)

406

```
// EXTERN version of setjmp
setjmp(env) {
  // notify tailing thread
  // to run tailing_setjmp
  send tailing_setjmp
  send dummy

  // cannot make call inside
setjmp
  send env
  _setjmp(env);
}

// EXTERN version of longjmp
longjmp(env) {
  // notify tailing thread
  // to run tailing_longjmp
  send tailing_longjmp
  send dummy

  send env
  _longjmp(env);
}
```

TRANSIENT FAULT DETECTION BY INTEGRATING AN SRMT CODE AND A NON SRMT CODE IN A SINGLE APPLICATION

FIELD

The present disclosure relates generally to transient fault detection using Software-based Redundant Multi-Threading (SRMT) approach, and more particularly to running a SRMT code along with a Non SRMT code for transient fault detection.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

FIG. 3 illustrates code generation depicting handling of call to and call back from a normal function; and FIG. 4 illustrates code generation depicting control flow outside the SRMT functions.

Like reference numerals refer to like parts throughout the description of several views of the drawings.

DETAILED DESCRIPTION

Figure 1:
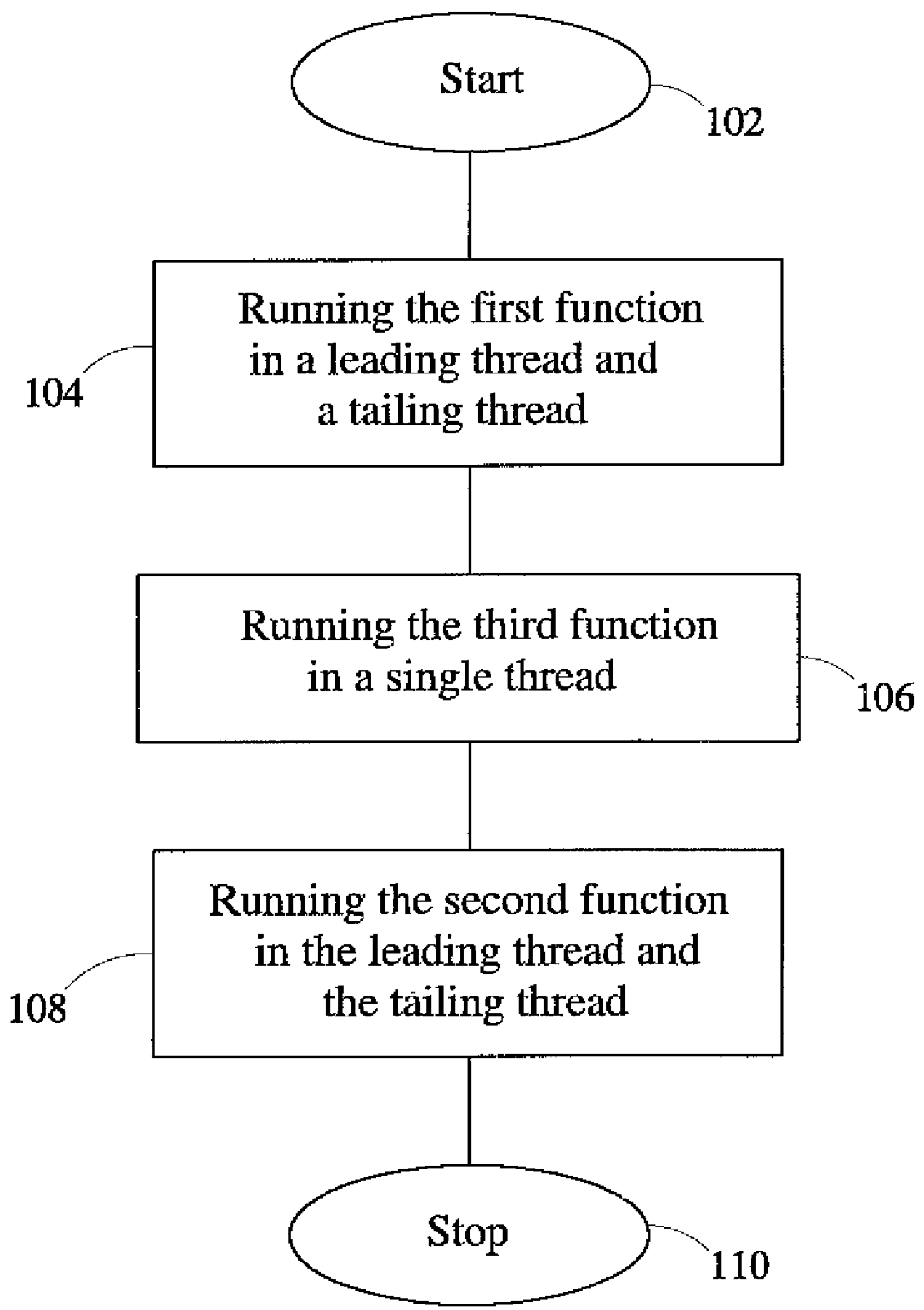
FIG. 1 is a flowchart illustrating a method for running a first code generated by a Software-based Redundant Multi-Threading (SRMT) compiler along with a second code generated by a normal compiler at runtime.

For a thorough understanding of the present disclosure, refer to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient, but are intended to cover the application or implementation without departing from the spirit or scope of the claims of the present disclosure. Also, it is to be understood that the phraseology and terminology used herein is for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The present disclosure provides for a method for transient fault detection by integrating code generated by a Software-based Redundant Multi-Threading approach (SRMT) compiler with code generated by a non-SRMT/normal compiler. By integrating code generated by a SRMT compiler with code generated by a non-SRMT compiler, the present disclosure reduces the overhead involved in recompilation of the functions having built-in reliability features. Additionally, the present disclosure also addresses the concerns of applications having part of the code that users consider unnecessary with redundant computation. For example in audio and video applications, the present disclosure eliminates the need for recompiling the code, thereby enhancing the real-time requirements of the aforesaid code. Furthermore, the implementation of the present disclosure eliminates the need for recompilation of applications invoking third party library code without a source. The present disclosure provides for a uniform mechanism for handling function calls such that SRMT functions and binary functions can freely call each other irrespective of whether the callee function is a SRMT function or a binary function. The present disclosure thereby dynamically adjusts the application reliability and performance tradeoff based on run-time information and user selectable policies.

As used hereinafter, binary functions are referred to parts of a program that are not compiled for SRMT and a part of the program compiled for SRMT collectively is referred to as SRMT functions. Furthermore, the code generated by the SRMT compiler is referred to as SRMT code In SRMT, different versions of a SRMT function are run in different threads for reliability. The present disclosure seamlessly integrates binary functions into SRMT, by running binary function in one thread and thereby skipping running the other thread for possible non-repeatable side effects of the binary function.

Even if one can generate different code sequences for function calls to run different versions of SRMT functions in different threads and run binary functions in only one thread, the compiler may not statically know whether a callee function is actually a binary function or not in the present of the function pointers and separate compilation. The present disclosure provides a SRMT compiler that ensures the code generated by the SRMT compiler works irrespective of whether a callee function is a binary function or not. Furthermore, without making modifications to the binary functions, the present disclosure ensures that the SRMT functions called by binary functions run in different threads with different versions.

The present disclosure provides for a mechanism wherein the SRMT code and binary function can interact with each other in the same application. The SRMT compiler generates code in a manner such that the SRMT function running in two threads calls a binary function to run in one thread only, and the binary function calls back to another SRMT function, which will again be run by both the threads.

Figure 2:
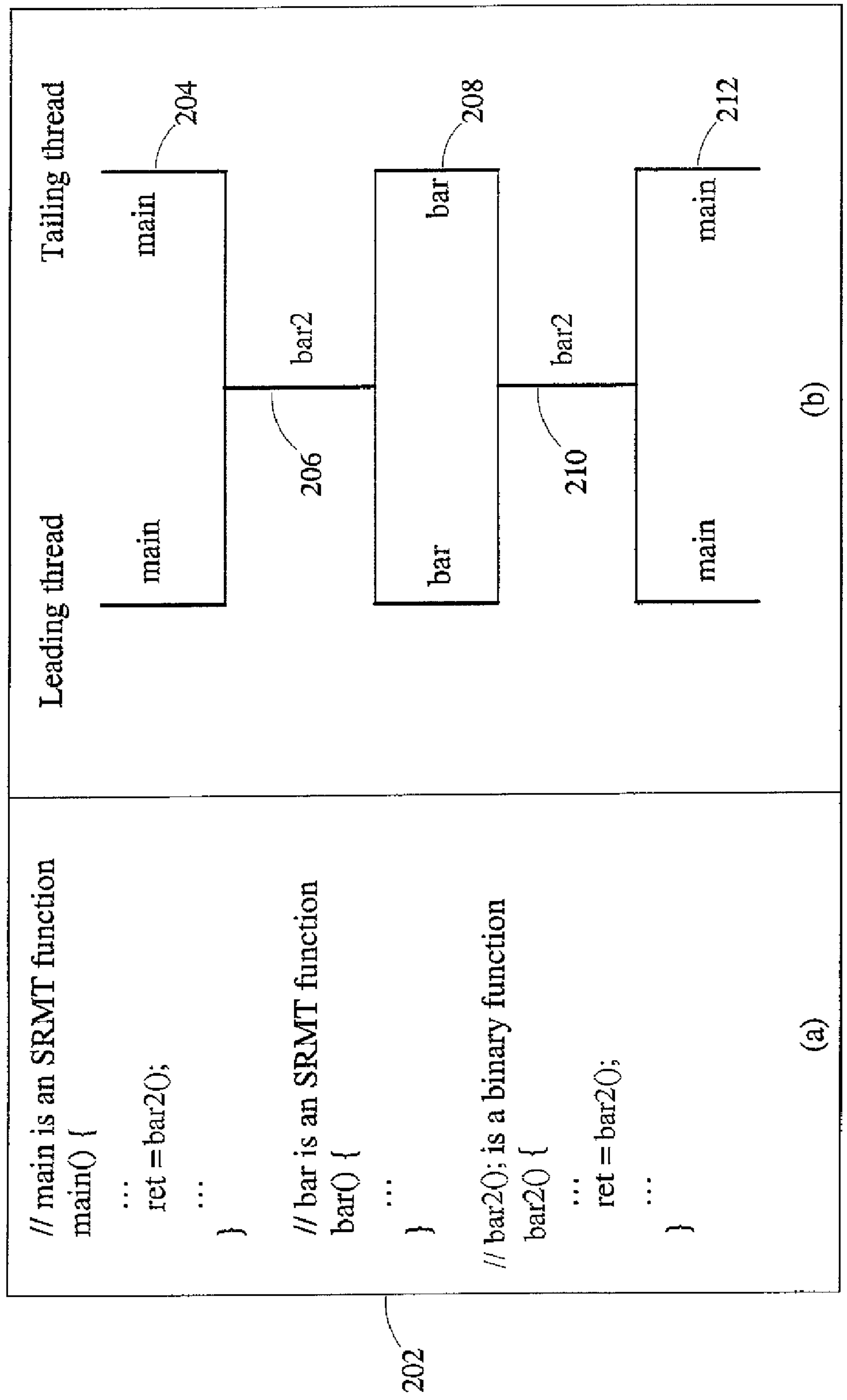
FIG. 2 is scenario illustrating a SRMT function calling a binary function, and the binary function calling another SRMT function.

Now, referring to FIGS. 1 and 2, illustrated is a method for running a first code generated by a SRMT compiler along with a second code generated by a normal compiler. Additionally, the figures also illustrate a scenario showing a SRMT function calling a binary function and the binary function thereafter calls another SRMT function. The SRMT functions main ( ) and bar ( ) described in 202 of FIG. 2 comprise the first code generated by the SRMT compiler. The second code generated by the normal compiler corresponds to the function bar2 ( ) described in 202 in FIG. 2. At operation 102 of FIG. 1, the method is initiated once a request for running the first code and the second code is made by a user. At operation 104, the first function is run in a leading thread and a tailing thread, represented as 204 wherein the first function corresponds to the function main ( ) in FIG. 2. The first function calls the third function, wherein the third function corresponds to the function bar2 ( ). At operation 106, the second function is run in a single thread represented as 206, since the second function is a binary/Non SRMT/normal function, therefore it is run in the single thread 206. The third function calls the second function, the second function corresponds to function bar ( ). At operation 108 the second function is run in the leading thread and the tailing thread represented as 208. At operation 110, the method is terminated after running the first code and the second code.

The calling of the binary functions by the SRMT functions, for example, the first function calling the third function is implemented by calling the third function by the first leading thread and sending the return results to the first tailing thread. The first tailing thread uses the result without calling the third function.

The calling of the SRMT functions by the binary functions, for example, the third function calling the second function is implemented by using an extern version, a wrapper, of the SRMT function in addition to the leading thread and the tailing thread of the SRMT function. The extern version has the same prototype as the original SRMT function, such that, it can be directly called by the binary function. When an extern version is called by the binary function, the extern version not only executes the leading thread of the SRMT function, but also requests the tailing thread to execute the tailing thread of the SRMT function.

Referring to FIG. 3. illustrated is a code generation depicting handling of call to and call back from a normal function. FIG. 3 is described with reference to the first code and the second code 202 in FIG. 2. FIG. 3 shows the SRMT code capable of handling call to and call back from binary functions for the first code and the second code 202. As shown in FIG. 3, Leading_main ( ) calls binary function bar2 ( ). The Leading_main ( ) sends the END_CALL and the return value 'ret' to the tailing thread after the function call returns as shown at block 302. Tailing_main ( ) waits in a wait_for_notification loop until it receives END_CALL, as shown at block 304. When the binary function bar2 ( ) calls back SRMT function bar ( ), the EXTERN version of function bar ( ) notifies the tailing thread by sending the corresponding function pointer tailing_bar and the corresponding parameters to the tailing thread so that the tailing thread can correctly make a call to tailing_bar with the function pointer and parameters, as shown at block 306.

The EXTERN version of function bar ( ) assumes that there always exists a corresponding tailing thread running in the wait_for_notification loop. This is true if function bar ( ) is always (nested) called by a SRMT function (in this case function main ( )). In case that the function bar ( ) may not be (nested) called by any SRMT function, a runtime checking in the EXTERN version of function bar ( ) is added and a new thread is forked to run the tailing_bar if there is no corresponding tailing thread running.

The above scheme also works for function calls through pointers. A function pointer points to either an EXTERN version of a SRMT function or a binary function. The SRMT compiler generates code as if the indirect call is to a binary function (for example. the code similar to those shown in blocks 302 and 304). If the callee function turns out to be a SRMT function, its EXTERN function will be called, which in turn calls the leading function and notifies the tailing thread to execute the tailing function.

FIG. 4 illustrates a code generation depicting control flow outside the SRMT functions. The control flow outside the SRMT functions occur when there is a special non-return or abnormal-return function such as setjmp, longjmp and exit. The present disclosure provides versions of the above functions, such that, these versions can be called by either an SRMT function or a binary function. FIG. 4 shows special leading 402, tailing 404, and EXTERN 406 versions of setjmp and longjmp, where _setjmp and _longjmp represent the inlined common bodies of the setjmp and longjmp, respectively. The leading and tailing versions of the setjmp/longjmp uses different environments, such that, the leading longjmp jumps to the environment (env) set by the leading setjmp, and the tailing longjmp jumps to the environment (new_env) set by the tailing setjmp. A hash table is maintained in the tailing thread for mapping the environments between the leading thread and the tailing thread. The hash_alloc function allocates a new entry in the hash table and the hash_lookup function searches the hash table for an entry. When the leading thread calls a binary function, such as bar2 ( ), which in turn calls an EXTERN version of setjmp or longjmp, the EXTERN version of setjmp or longjmp notifies the tailing thread to run the TAILING version of these functions and also performs the setjmp or longjmp operations for the leading thread. Further, when the EXTERN version of setjmp/longjmp is called, the tailing thread executes the wait_for_notification loop at the call site of the binary function bar2 ( ) as shown in block 304.

As described above, the embodiments of the disclosure may be embodied in the form of computer-implemented processes and apparatuses for practicing those processes. Embodiments of the disclosure may also be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the disclosure. The present disclosure can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the disclosure. When implemented on a general-purpose microprocessor, the computer program code segments configure the microprocessor to create specific logic circuits.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is understood that various omissions and substitutions of equivalents are contemplated as circumstance may suggest or render expedient, but are intended to cover the application or implementation without departing from the spirit or scope of the claims of the present disclosure.

What is claimed is:

1. A method for running a first code generated by a Software-based Redundant Multi-Threading (SRMT) compiler along with a second code generated by a normal compiler at runtime, the first code including a first function and a second function, the second code including a third function, the method comprising:

running the first function in a leading thread and a tailing thread;

running the third function in a single thread, wherein the leading thread calls the third function; and running the second function in the leading thread and the tailing thread, wherein the third function calls the second function;

wherein running the third function in the single thread comprises sending a return result by the leading thread to the tailing thread.

2. The method of claim 1, wherein running the second function in the leading thread and the tailing thread comprises:

calling an extern version of the second function by the third function, wherein the extern version of the second function is a wrapper of the second function and is configured to be called directly by the third function; and running the second function in the leading thread and the tailing thread by the extern version of the second function.

3. The method of claim 1, further comprising maintaining a hash table in the tailing thread for providing control flow outside the first function, the second function and the third function.

4. The method of claim 1, wherein running the first code generated by the SRMT compiler along with the second code generated by the normal compiler at runtime is used for transient fault detection.

5. The method of claim 1, wherein the second function comprises instructions capable of invoking a third party library code.

6. The method of claim 1, wherein the second function comprises instructions for playing audio and video.

7. The method of claim 1, wherein the third function is called by the first function through a pointer.

8. The method of claim 1, wherein the second function is called by the third function through a pointer.

9. A method for running functional calls between a Software-based Redundant Multi-Threading (SRMT) function and a normal function, the method comprising:

maintaining a hash table in a tailing thread for providing control flow outside the SRMT function and the normal function; and either calling the SRMT function by the normal function comprising calling an extern version of the SRMT function by the normal function, and running the SRMT function in a leading thread and the tailing thread, by the extern version of the SRMT function; or calling the normal function by a leading thread of the SRMT function, and running the normal function in a single thread.

10. The method of claim 9, wherein running the normal function in the single thread further comprises sending a return result by the leading thread of the SRMT function to the tailing thread of the SRMT function.

11. The method of claim 9, wherein the normal function comprises at least one of instructions capable of invoking a third party library code and instructions for playing music and video.

12. The method of claim 9, wherein the normal function is called by the SRMT function through a pointer.

13. The method of claim 9, wherein the SRMT function is called by the normal function through a pointer.

14. A computer program product embodied on a computer readable storage medium to run a first code generated by a Software-based Redundant Multi-Threading (SRMT) compiler with a second code generated by a normal compiler at runtime, the first code including a first function and a second function, the second code including a third function, the computer program product comprising a program module having instructions for:

running the first function in a leading thread and a tailing thread;

running the third function in a single thread, wherein the leading thread calls the third function; and running the second function in the leading thread and the tailing thread, wherein the third function calls the second function;

wherein running the third function in the single thread comprises sending a return result by the leading thread to the tailing thread.

15. The computer program product of claim 14, wherein running the second function in the leading thread and the tailing thread comprises:

calling an extern version of the second function by the third function, wherein the extern version of the second function is a wrapper of the second function and is configured to be called directly by the third function; and running the second function in the leading thread and the tailing thread, by the extern version of the second function.

16. The computer program product of claim 14, further comprising maintaining a hash table in the tailing thread for providing control flow outside the first function, the second function and the third function.

17. The computer program product of claim 14, wherein the second function comprises at least one of instructions capable of invoking a third party library code and instructions for playing audio and video.

* * * * *